Dec. 10, 1963  I. H. PAGE  3,114,110
FIXED PULSE REJECTION SYSTEM FOR RADAR MOVING TARGET INDICATOR
Filed May 1, 1951  2 Sheets-Sheet 1
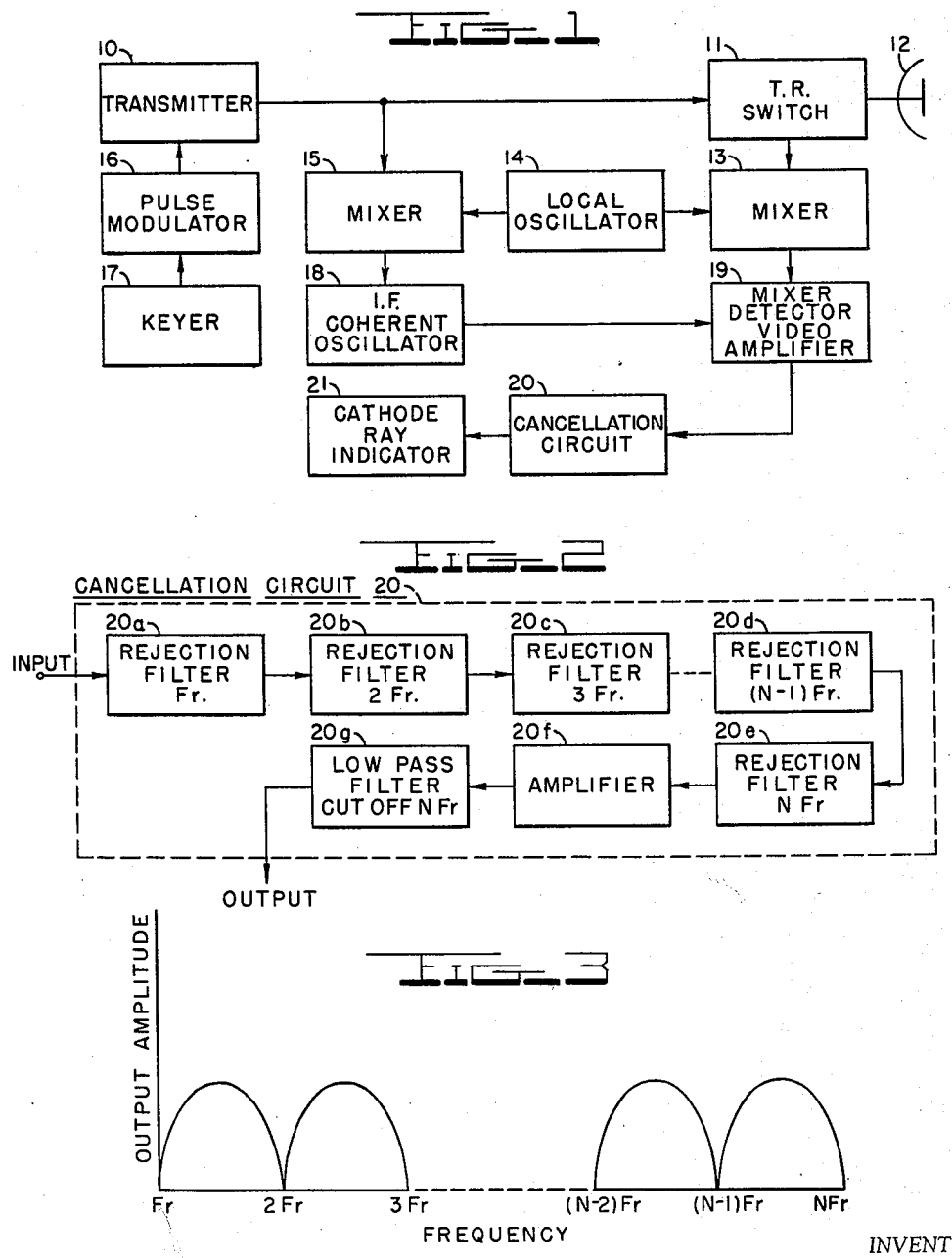
INVENTOR
IRVING H. PAGE

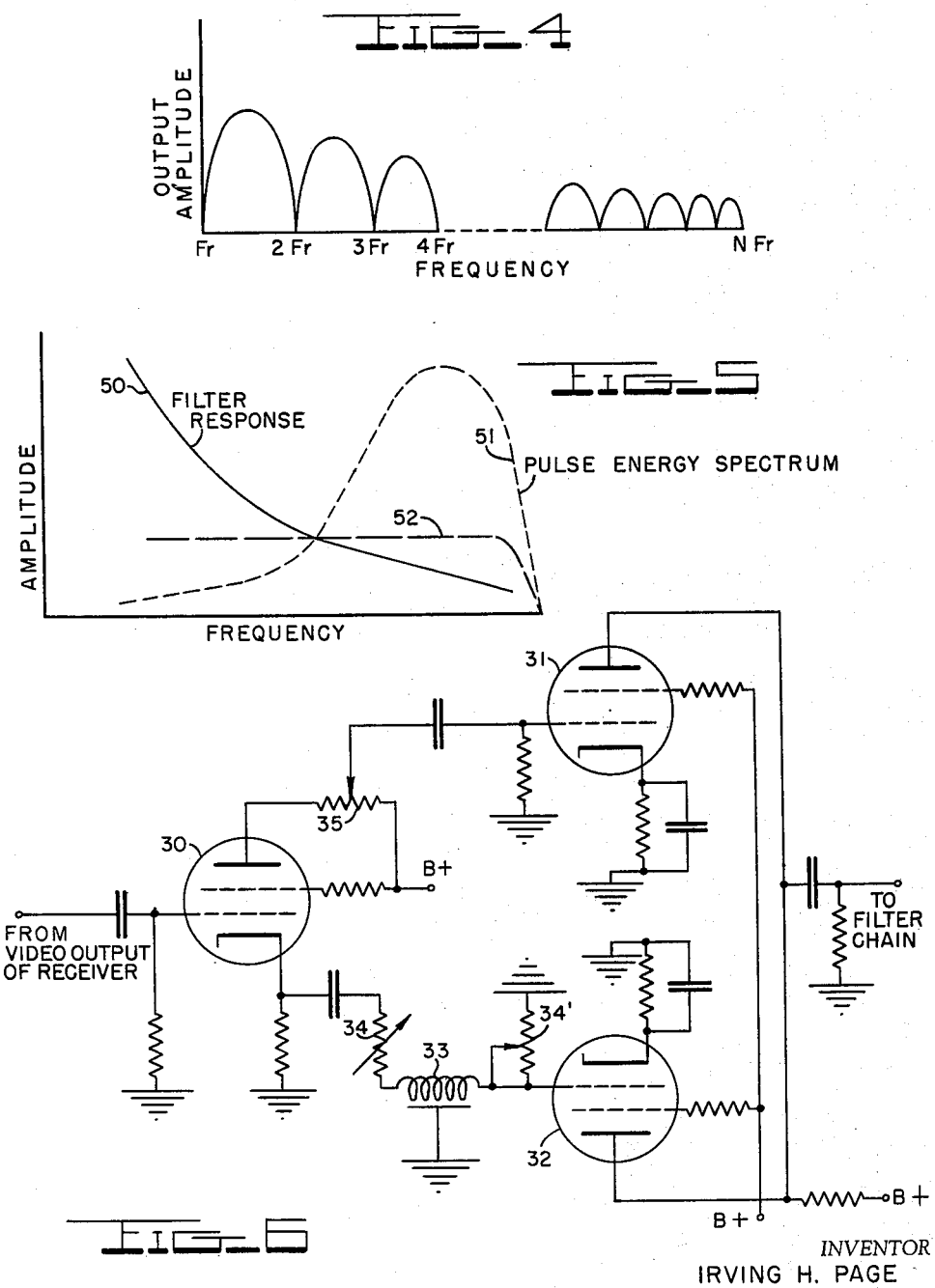

United States Patent Office 3,114,110
Patented Dec. 10, 1963

3,114,110
FIXED PULSE REJECTION SYSTEM FOR RADAR MOVING TARGET INDICATOR
Irving H. Page, % Naval Research Laboratory, Anacostia Station, Washington 25, D.C.
Filed May 1, 1951, Ser. No. 224,019
2 Claims. (Cl. 328—167)
(Granted under Title 35, U.S. Code (1952), sec. 266)

This invention relates in general to pulse echo detection equipment and in particular to improvements in apparatus for detecting and indicating the range of moving objects to the exclusion of stationary objects.

In general, most moving object detector systems rely on the Doppler frequency shift phenomena as a basis for their operation. By Doppler frequency shift is meant the change in the frequency of a transmitted signal after reflection from a moving object. In other words, a signal of frequency $f$ reflected from a moving object whose radial velocity in miles per hour is $v$, attains a new frequency $f'$ which may be equated as follows:

$$f' = \frac{C+V}{C-V} f$$

In the above equation $f'$ equals the frequency of the signal after reflection, $f$ the frequency of the signal before reflection, $c$ the velocity of light and $v$ equals the component, in miles per hour, of radial velocity of the moving object.

In continuous wave Doppler systems a portion of the transmitted continuous wave is applied directly to the receiver and is heterodyned with the reflected signal to produce a beat note the frequency of which is a measure of the Doppler frequency shift of the signal due to reflection from a moving object and is equal to two times the radial velocity of the moving object divided by the wave length of the transmitted signal; i.e., $$f \text{ (Doppler)} = \frac{2v}{\lambda}$$

In the application of the Doppler frequency shift principle to pulse systems such as radar and sonar detection devices the Doppler frequency shift manifests itself as an amplitude modulation of the video output signal from the echo receiver. The modulation frequency of the video output of the echo receiver corresponds to the Doppler frequency shift and is a measure of the radial motion of the object detected.

In some pulse echo detection applications the video output of the receiver may be viewed directly on a cathode ray indicator tube. In these systems the video pulses caused by signal reflection from stationary objects remains substantially fixed in amplitude from one transmitted pulse to the next while those video pulses which result from a signal being reflected by a moving object fluctuate in amplitude from one transmitted pulse to the next. This fluctuation occurs at the Doppler frequency shift rate and these signals are readily distinguishable from those resulting from reflection from stationary objects.

Moving object detection by pulse echo detection systems of the above type is perfectly satisfactory in installations where the antenna is either stationary or is moved at a very slow rate but is entirely inadequate in those installations where the antenna is scanned such as in a plan position indicator type of radar system. In radar systems of this last mentioned type all of the echoes, due to the antenna movement receive some Doppler frequency shift and if they were viewed directly on a cathode ray tube indicator all would appear to be reflections from moving objects thereby rendering it difficult if not impossible for an operator to visually discriminate between indications produced by moving objects and those produced by stationary objects.

Accordingly and in the past where the Doppler frequency shift principle has been applied to radar systems employing a scanning antenna, a system of echo cancellation has been used. More particularly, the echo signals resulting from one transmitted pulse have been delayed a complete transmitter cycle and substractably combined with the corresponding echo signals resulting from the next succedent transmitted pulse. In this way those echo signals which result from signal reflection by stationary objects and which do not vary materially in amplitude from pulse to pulse cancel while those echo signals which result from moving objects and which fluctuate in amplitude from one transmitted pulse to the next do not cancel and they may be viewed or their presence determined in a conventional manner on a cathode ray tube indicator screen. While the results from such systems are entirely satisfactory the fact that the cancellation circuits require the use of such complex components as "a supersonic delay line" or "storage tubes" renders these systems both delicate and expensive. Also the equipment used in conjunction with these delicate and sensitive components further complicates the detection system in general, and thereby further reduce the appeal of the system for mass production technique.

It is accordingly an object of the present invention to provide a new and improved cancellation network for pulse type moving object detector systems.

It is another object of this invention to provide a simple, inexpensive, and yet remarkably reliable cancellation network for pulse type moving object detector systems.

It is another object of this invention to provide a simplified radar moving object indicator.

These and many other objects of the present invention will become apparent upon a careful consideration of the following detailed description when taken in conjunction with the drawings, FIG. 1 of which is a block diagram of one type of moving object indicator system with which the cancellation circuit of the present invention may be used.

FIG. 2 is a block diagram of a preferred embodiment of the present invention, FIGS. 3, 4 and 5 are graphical plots useful in explaining the operation of the circuit shown in FIG. 2, and FIG. 6 is a circuit diagram of one type of pulse distortion circuit useful in the present invention.

Referring now to FIG. 1 reference character 10 represents a high power transmitter which is coupled through a conventional transmit receive switch 11 to an antenna 12 which is preferably directional and rotatable both in azimuth and elevation. Transmitter 10 operates in response to a pulse from modulator 16 to emit short bursts of high powered energy at a stable repetition rate controlled by a conventional keyer 17. Since transmitter 10 operates intermittently and is normally in an inoperative state during the receipt of an echo some means other than the transmitted signal itself must be provided for heterodyning with the echoes to derive the Doppler frequency shift signal. This may be accomplished in a number of different ways, but for the purpose of illustration I choose to provide the heterodyne action by the addition of an IF coherent oscillator 18. Oscillator 18 operates continuously and is mixed as hereinafter described in mixer amplifier 19 with the return signals to produce the desired Doppler beat notes. The Doppler beat note is in part a function of the phase of the coherent oscillator 18 and the starting phase of transmitter 10. While oscillator 18 is in general a very stable device transmitter 10 is subject to a random phase shift, that is the starting phase of its oscillation will vary from one pulse to the next. Therefore it is important in the production of the Doppler frequency beat not to correlate or lock the phase of the coherent oscillator 18 into a predetermined relation with the starting phase of the RF transmitter 10. This is accomplished by coupling a small amount of power from the output of transmitter 10 to a suitable mixer 15 and then beating this energy with a second local oscillator preferably of a stable nature indicated in general at 14. Oscillator 14 like oscillator 18 is continuously running and its frequency is adjusted so that the beat frequency difference between transmitter 10 and oscillator 14 equals the IF frequency of coherent oscillator 18. The output signal from mixer 15 which corresponds in frequency to that of the oscillator 18 has a starting phase equivalent to that of transmitter 10 and is impressed on oscillator 18 to lock the latter's phase into the desired relationship with that of the transmitter 10. To reduce the echo signals to a suitable intermediate frequency for heterodyning with oscillator 18, the local oscillator 14 is also coupled to a receiver mixer 13. Thus the output signal from mixers 13 and 15 as well as that from the output of oscillator 18 all occur at the same IF frequency and are heterodyned together in a third mixer amplifier arrangement 19 in order to yield a Doppler modulated video output therefrom. The Doppler modulated video is then passed through a cancellation circuit 20 to a suitable cathode ray tube indicator 21 for presentation.

As previously mentioned the purpose of cancellation circuit 20 is to cancel or reject the echo signals returned from stationary objects and at the same time to pass the echo signals returned from moving objects. As taught by the present invention this is accomplished by passing the video output from the mixer amplifier 19 through a rejection filter circuit tuned to reject the various Fourier components in the video output from the mixer amplifier 19. In more particular, the rejection filter circuit is arranged to reject frequencies equal to the transmitter repetition rate and its harmonics and at the same time to pass the frequency components between these rejection points. In this way, the rejection filter operates to eliminate the video pulses resulting from reflection by stationary objects while the Doppler modulation component and its side band components which normally do not occur at the rejection frequencies of the filter are free to pass through the circuit and to appear at the input of the cathode ray tube indicator 21 for visual presentation.

In more particular, the video output from amplifier 19 caused by a signal being reflected from a stationary object may be considered to be constituted by a series of harmonically related signals starting at Fr the repetition rate of the transmitter and extending at least out to the reciprocal of the transmitted pulse duration. Thus if each of these components is carefully rejected then the other components namely the Doppler modulated component output from mixer 19 may be passed on to the input to cathode ray tube indicator 21.

As shown in FIG. 2 the rejection filter circuit comprises in its preferred embodiment a plurality of rejection filters typified at 20a, 20b, 20c, 20d, 20e, and etc. connected in cascade. Each successive filter is tuned to the next higher harmonic of the transmitted video pulse. If desired a suitable amplifier such as is typified at 20f may be inserted at one or more points in the filter chain to compensate for filter insert losses. The number of filters comprising the chain is more or less dependent on the duration of the pulse and on the desired range resolution. In general the wider the pulse the fewer the number of filters required. In one case 20 filters has been found to be suitable while in another system employing one microsecond pulses occurring at 3000 pulses per second, 100 filters were used. As will be noted, no attempt is made to cancel all the harmonics of the video pulse since this will require a prohibitive number of filters. Accordingly and in order to effect a more complete cancellation of the Fourier components of the video, a low pass filter such as 20g tuned to the cut-off frequency of the highest frequency rejection filter may be included. This provides a more complete cancellation or elimination of the higher order harmonics which might be included in the video output from amplifier 19. In practice, filters of the well known bridged T type have been found to be extremely satisfactory for use in the rejection circuit.

FIG. 3 shows in idealized form the output amplitude variation of the filter chain versus frequency variation in the input to the chain. As here shown each of the components in the Fourier series starting at Fr, 2Fr, 3Fr and so on is very sharply attenuated while signals having frequencies which fall in between the harmonic components are free to be communicated to the output of the filter chain. In this way the Doppler modulation component which is independent of the pulse repetition rate as well as its side band components appearing at the output from amplifier 19 which do not fall within the rejection points of the filter chain are free to be applied to the input of the cathode ray tube indicator 21.

As previously mentioned, the response curve shown in FIG. 3 is somewhat idealized in that it assumes that the Q of the filters increases with frequency. In practice however where the Q of the filters is finite, the response will continuously drop with frequency somewhat as shown in FIG. 4. This type of frequency response characteristic of course will reduce the quality of reproduction of the Doppler frequency shift components and its side bands in the output of the filter chain. This loss of quality in reproducton may be considered inconsequential in radar systems where range resolution is secondary and is less for systems having high duty cycles; that is, high ratios of pulse duration to pulse recurrence rate period.

However, in radar applications where range resolution is a primary factor it may be desired to compensate for the loss in frequency response of the filter by distorting the pulse before application to the rejection filter. One method of distorting the pulse is by pulse stretching to reduce the harmonic content of the pulse. A more satisfactory solution however is to distort the pulse in such a manner that its energy spectrum is shifted to compensate for the non-linearity in filter response. For example as shown graphically in FIG. 5, if curve 50 shows the envelope of the output response of the filter chain, then changing the energy spectrum of the pulse to resemble the reciprocal of the filter response curve 50 as shown by curve 51, the output signal of the filter chain can be made to resemble curve 52 in the idealized condition.

This compensatory action may be substantially realized by the circuit shown in FIG. 6. As here shown the circuit for driving the rejection filter circuit provides circuit means for converting each applied video pulse into a pair of pulses one delayed from the other. In the preferred arrangement the pulses comprising each pair have opposite polarity and are separated in time by an interval equal to a half-period of the frequency of the highest frequency rejection filter. Alternatively the pulses comprising the pair could be spaced twice this period and made of similar polarity. As shown in the figure the signal to be distorted is first fed to the grid of a balanced anode-cathode phase splitter 30. The inverted signal present in the plate circuit of this tube is then coupled to the grid of a suitable amplifier 31 the plate of which is connected in parallel with the plate of a second similar amplifier 32.

The grid of the second tube 32 is coupled to the cathode of the phase splitter 30 through a suitable delay device 33 such as a delay line. Variable resistances 34 and 34' are connected respectively in the cathode circuit of tube 30 and grid circuit of tube 32 to terminate the delay line 39 at each end in its characteristic impedance, while potentiometer 35 is added to equalize the amplitudes of the pulse pair. The delay line 33 is, as previously mentioned, adjusted to provide a delay equal to approximately one half period of the frequency of the highest rejection filter. With this circuit the spectral energy content of the pulse is restricted to a narrow band of frequencies peaked at substantially the frequency of the highest frequency rejection filter as shown by curve 51 in FIG. 5.

It will be immediately apparent from an inspection of curve 51, FIG. 5, that the function of the pulse distortion circuit in FIG. 6 is to transfer the energy spectrum of the video pulse from a point centered around zero frequency to a point centered around a second frequency which is determined by the time spacing of the pulse pair produced by the distortion circuit. Consequently, the circuit of FIG. 6 can be advantageously employed to drive with a high degree of efficiency any suitable band pass, pulse translating circuit. In such uses the frequency about which the pulse energy spectrum is centered should be adjusted to substantially equal the center frequency of the band pass circuit being driven.

Although I have shown and described only a certain and preferred embodiment of the present invention it must be understood that I am fully aware of the many modifications possible thereof. Therefore this invention is not to be restricted except as indicated by the scope of the disclosure and appended claims.

The invention described herein may be manufactured and used by or for the Government of the United States of America for governmental purposes without the payment of any royalties thereon or therefor.

What is claimed is:

1. A pulse converting circuit for transferring the energy spectrum of a pulse to a point centered around the center frequency of a frequency selective circuit comprising, a frequency selective circuit having a given center frequency, a pair of pulse translating channels arranged in parallel, one of which has incorporated therein a delay path for introducing a delay equal to half of the period of the center frequency, means for delivering each pulse to be converted in phase opposition to said pair of channels, and means for combining the outputs of said pair of channels and applying them to said frequency selective circuit.

2. A pulse converting circuit for transferring the energy spectrum of a pulse to a point centered around the center frequency of a frequency selective circuit comprising, a frequency selective circuit having a given center frequency, a pair of pulse translating channels arranged in parallel, one of which has incorporated therein a delay path for introducing a delay predeterminedly related to the center frequency of said frequency selective circuit, and means for combining the outputs of said pair of channels and applying them to said frequency selective circuit.

References Cited in the file of this patent

UNITED STATES PATENTS

| | | |
|---|---|---|
| 2,437,313 | Bedford | Mar. 9, 1948 |
| 2,479,568 | Hansen | Aug. 23, 1949 |
| 2,480,038 | Mason | Aug 23, 1949 |
| 2,523,283 | Dickson | Sept. 26, 1950 |
| 2,548,779 | Emslie | Apr. 10, 1951 |
| 2,555,121 | Emslie | May 29, 1951 |
| 2,598,689 | Hansen | June 3, 1952 |
| 2,697,826 | Dicke | Dec. 21, 1954 |
| 2,797,323 | Hronek et al. | June 25, 1957 |
| 2,831,109 | Casey | Apr. 15, 1958 |

OTHER REFERENCES

Ridenour: Radar System Engineering; vol. I of the Radiation Laboratory Series, page 632 (McGraw-Hill, 1947).